United States Patent Office 3,283,816
Patented Nov. 8, 1966

3,283,816
ACIDIZING WELLS
Bryant W. Bradley, Pasadena, Calif., assignor to Shell Oil Company, New York, N.Y., a corporation of Delaware
No Drawing. Filed Apr. 13, 1964, Ser. No. 359,480
1 Claim. (Cl. 166—42)

This invention relates to the acid treatment of subterranean geological formations and pertains more particularly to a manipulative technique for introducing acidic reagents and other fluids into a formation whereby the acidic reagents react with at least portions of the formation to increase the permeability and/or porosity of the formation thereby reducing the resistance of the formation to the flow of fluids therethrough.

The susceptibility of fluid-bearing geological formations to treatment with chemical reagents has resulted in the development of a number of processes which employ acidic reagents to remedy geological formations having low production rates due to their low permeability, discontinuous porosity, or to the presence of formation plugging contaminating materials which may form and accumulate on or in the formation. Since the time when hydrochloric acid was first employed for the treatment of dolomitic formations, considerable attention has been directed to the application of other acid reagents used either alone or in combination, in the course of these investigations, other reagents, both inorganic and organic, have been found which are effective in treating dolomitic or limestone formations. In addition, the capabilities of other acidic reagents for treating siliceous formations have been appreciated. In general, calcareous and siliceous formations are of a heterogenous nature and contain a number of constituents such as iron, aluminum, alkali metals and alkaline earth metals. As a result, a common problem to all methods of acidizing is the formation of precipitates within the formation interstices through the action of the acidic-treating reagent or its by-products on some precipitate-forming constituent of the formation. Considerable attention has been directed to mitigation of this problem and a number of remedies have been suggested for application as a pre-treatment step or as a concomitant step to be carried out simultaneously with the acidizing operation. In addition, that phase of precipitate formation which occurs as a result of the interaction between the spent-treating reagent and the precipitate-forming constituents of the formation has also been considered. This invention is concerned with the forestalling of the detrimental plugging effects resulting from the interaction between certain acidic reagents and the alkali metals and alkaline earth metals present in the formation.

The technique of acidizing was originally carried out by introducing the acid into the formation and allowing it to remain in contact with the formation surfaces for a length of time considered to be sufficient for the acidizing reaction to go to completion. This expedient often has detrimental effects in as much as if the spent acid was allowed to remain in the pore spaces, the danger that insoluble residues or the formation of secondary reaction products which would plug the interstices might occur. As a result, it is often considered good practice to withdraw the spent acid from the formation back into the well, which operation gives rise to a number of problems such as the necessity of employing additional equipment to effect the removal of the spent acid, the disposal of this spent acid, etc.

It is therefore an object of the present invention to provide a method which overcomes the problems arising from the removal of spent acid and the reaction products formed thereby from the vicinity of the well from which the formation is being treated.

While many formations in communication with a well are acidized to increase the permeability thereof so as to obtain better flow rates from an oil-bearing formation, other formations in communication with a well may be acidized in order to increase the water intake rate of the formation where secondary recovery operations are being carried out by flooding the former-producing formation which may consist largely of sandstone or other siliceous rock. Generally, the acidizing operations consist of introducing into the geological formation a fluid reagent such as hydrochloric acid or hydrofluoric acid, either alone or in combination, for the purpose of causing the acid to dissolve the siliceous structure of the formation and thereby increases permeability.

In U.S. Patent No. 2,367,350, there is disclosed a method of increasing the permeability of a geological formation containing both silicates and carbonates by first treating the formation with hydrochloric acid and then injecting a mixture of hydrochloric and hydrofluoric acid, the theory being that the initial hydrochloric acid pretreatment eliminates the formation of precipitates which otherwise would be produced by the reaction of hydrofluoric acid on carbonates. Similarly, U.S. Patent No. 2,225,695 discloses a method of opening sandstone formations by treating the well first with hydrofluoric acid to attack the siliceous material and then treating with hydrochloric acid to dissolve the precipitates or reaction products resulting from the hydrofluoric acid treatment. Additionally, in U.S. Patent No. 2,885,004, a method is disclosed of treating sandstone formations first with hydrochloric acid, then with a mixture of hydrochloric acid and hydrofluoric acid of specific strength, which treatment is subsequently followed by another treatment with hydrochloric acid.

While the above-described types of acid treatment either minimize or get rid of certain alkaline earth metal precipitates, such for example as calcium fluoride, no provision is made for minimizing or preventing the formation of alkali metal fluorosilicates which are often formed and also tend to plug the pores of the formation.

It is therefore a primary object of the present invention to provide a method whereby most of the alkali metal ions in a formation in the vicinity of a well are moved away from the well a distance sufficient to prevent their reacting with hydrofluoric acid to any substantial degree thereby eliminating or substantially minimizing any plugging tendencies of precipitates formed through the reaction of an acidic reagent with compounds containing alkali metal ions.

A further object of the present invention is to provide a method of injecting fluids into a formation whereby any alkaline earth metal ions contained in the formation are tied up in a manner whereby they can be moved to a substantial distance away from an injection well penetrating the formation being treated.

The present invention provides a method of treating a silicate-bearing formation to increase the permeability in the vicinity of a well penetrating the formation and at the same time reducing the alkaline earth metal ions and the alkali metal ions in the vicinity of the injection well to a value whereby the treating method may be effectively carried out and subsequent injection of liquid into the formation or withdrawal of oil from the formation is enhanced.

In carrying out the instant invention, it is preferred that acid be introduced into the formation to be treated by means of conventional displacement techniques.

One of these techniques involves installing within the well bore a tubing string extending from the surface or wellhead to a point adjacent the formation into which the acid is to be applied. A pair of spaced packers may be mounted on the tubing string to close the well above and below the formation to be acidized with the acid being discharged from the tubing string into the isolated well interval between the packers and thence into the formation. The pumping of acid down the tubing string is continued so as to force the acid into the formation until the desired amount of acid has been introduced. In the first step, in accordance with the present invention, hydrochloric acid of from 10–30% concentration, and preferably being inhibited by the addition of any suitable corrosion inhibiting agents, is pumped down the well and into the formation to dissolve any alkaline earth metals, such as calcium, which are native to the formation or which have been deposited, say as calcium carbonate scale, on the inner face of the bore hole. This first treatment is to remove the calcium from the formation so that it will not be contacted by the hydrofluoric acid, thereby preventing the formation of a calcium fluoride precipitate which would tend to plug the formation.

In the second step of the present method, the spent hydrochloric acid in the formation and the alkaline earth metal ions or reaction products carried by the spent acid are displaced radially away from the well by injecting into the formation in back of the hydrochloric acid a quantity of a non-acidizing spacer fluid which may be water or a hydrocarbon material. Unfortunately, most of the oil fields are located in areas where the water is extremely hard and contains alkaline earth metal ions. Thus, an attempt to displace the spent hydrochloric acid further into the formation by pumping untreated water down the well in back of the acid would only cause the introduction into the formation of additional alkaline earth metal ions which would form precipitates with hydrofluoric acid when it was subsequently injected into the formation. The spacer fluid to be injected in back of the hydrochloric acid treatment is preferably water in the form of naturally-occuring soft drinking water, demineralized water, or water softened by a sodium ion exchange treatment which is well known to the art. Generally, all of these sources of water include alkali metal ions such as sodium ions. In addition, where certain formations to be treated include clays in their makeup, they are generally sensitive to treatment with low saline waters which would cause swelling of clays and hence reduce the permeability of the formation, and hence must be treated with a brine such as a sodium ion exchange softened water to which sodium chloride has been added. Thus, whenever water is used as the spacer fluid in the back of the hydrochloric acid treatment, it is generally certain that alkali metal ions would be contained therein which would form alkali metal fluorosilicates when a subsequent hydrofluoric acid treatment was carried out.

Thus, if the original aqueous hydrochloric acid solution of the following spacer fluid contains alkali metal ions, the last of the spacer fluid to be injected into the formation should be free of alkali metal ions so as to sweep the formation in the vicinity of the well free of alkali metal ions which might form fluorosilicates in the formation and thus reduce the permeability thereof. If desired, the last part of the spacer fluid may be an aqueous solution of hydrochloric acid which is made up so that it is free of alkali metal ions. In other locations, it is practical to use a hydrocarbon fluid which is free of sodium ions to serve as the spacer fluid and sweep any sodium ions from the formation in the vicinity of the well in addition to sweeping the spent hydrochloric acid of the first part of the method deep into the formation.

The last injection of fluid according to the present method involves the injection of a predetermined quantity of hydrofluoric acid and allowing the hydrofluoric acid to remain in contact with the formation adjacent the well for a time sufficient to dissolve silicate from the formation adjacent the well which has been swept clean of any contaminating alkali metal ions such as sodium. After the hydrofluoric acid has been in contact with the formation for the desired reaction time, the well may be returned to production if it is an oil-bearing formation, or may be employed as a water-receiving formation in the event that it is a water-injection well. The procedure in accordance with the present method accomplishes the dual objective of dissolving and removing calcium ions from the treatment zone to avoid calcium fluoride precipitation, and serves to displace any sodium-bearing water or other liquid away from the treatment zone so that no solid sodium fluorosilicate will be formed.

The size of each slug of acid or spacer fluid or displacement fluid, depends upon the whole diameter, the length of well interval open for treatment, the depth of the acid penetration around the well, and the porosity of the formation. It is realized that permeability variations of various formations will result in varying depths of treatment when using the technique of the present invention. The concentration of the hydrofluoric acid should be in the range of from about 3 to 6%. In the event that the formation to be treated has calcium present in the form of calcium sulfate, as a first step in the method of the present invention it would be necessary to inject into the formation a quantity of sodium or ammonium carbonate which would react with the calcium sulfate to form sodium sulfate and calcium carbonate. With calcium in the carbonate form, it could be readily dissolved by a following injection of hydrochloric acid.

I claim as my invention:

A method of treating a silicate-bearing formation to increase the permeability in the vicinity of a well penetrating said formation and wherein contaminating alkaline earth metal ions and alkali metal ions in said formation are reduced below a value which would be deleterious to said treating method and the permeability of said formation, said method comprising the steps of injecting through said well and into said formation a carbonate solution to convert any calcium sulfate present in the formation to calcium carbonate, injecting through said well and into said formation a quantity of hydrochloric acid sufficient to react with the portions of the formation containing alkaline earth metal ions, displacing said spent hydrochloric acid and said alkaline earth metal ions radially away from said well by injecting into said formation in back of said hydrochloric acid a quantity of a non-acidizing spacer fluid at least the last portion thereof being free of alkali metal ions, said spacer fluid injection being carried out for a time and with a volume of fluid sufficient to sweep compound containing contaminating alkali metal ions into the formation and away from the vicinity of the well, injecting into the formation in back of said spacer fluid a quantity of hydrofluoric acid, and allowing said hydrofluoric acid to remain in contact with the formation adjacent the well for a time sufficient to dissolve silicate from said portion of said formation.

References Cited by the Examiner

UNITED STATES PATENTS

| | | | |
|---|---|---|---|
| 2,225,695 | 12/1940 | Henderson et al. | 166—42 |
| 2,367,350 | 1/1945 | Heige | 166—42 |
| 2,765,039 | 10/1956 | Bond | 166—42 |
| 2,885,004 | 5/1959 | Perry | 166—42 |

CHARLES E. O'CONNELL, *Primary Examiner.*

JACOB L. NACKENOFF, *Examiner.*

S. J. NOVOSAD, *Assistant Examiner.*